United States Patent [19]

Arimoto et al.

[11] Patent Number: 4,644,160
[45] Date of Patent: Feb. 17, 1987

[54] SYSTEM FOR HOLDING PLURAL LIGHT BEAMS IN PREDETERMINED RELATIVE POSITIONS

[75] Inventors: Akira Arimoto, Musashimurayama; Susumu Saito, Hachiouji; Kimio Tatsuno, Kokubunji; Keiji Kataoka, Kawagoe, all of Japan

[73] Assignees: Hitachi, Ltd.; Hitachi Koki Co., Ltd., both of Tokyo, Japan

[21] Appl. No.: 680,497

[22] Filed: Dec. 11, 1984

[30] Foreign Application Priority Data

Dec. 14, 1983 [JP] Japan .................. 58-234245
Feb. 10, 1984 [JP] Japan .................. 59-21812

[51] Int. Cl.⁴ .................. G01J 1/20; H01J 40/14
[52] U.S. Cl. .................. 250/201; 250/578; 369/46

[58] Field of Search .................. 250/201 DF, 225, 578; 369/44, 45, 46

[56] References Cited

U.S. PATENT DOCUMENTS 4,567,362 1/1986 Kunz .................. 250/201 DF

Primary Examiner—Gene Wan
Attorney, Agent, or Firm—Antonelli, Terry & Wands

[57] ABSTRACT

Herein disclosed is a system using a plurality of laser beams, in which the positions of the respective laser beams are detected as the differences between the outputs of detectors of an optical detector arrangement and controlled by the difference signals so that they may be held mutually precisely. This system finds its suitable application to an optical disk recording system or a laser beam printer.

12 Claims, 15 Drawing Figures

SYSTEM FOR HOLDING PLURAL LIGHT BEAMS IN PREDETERMINED RELATIVE POSITIONS

BACKGROUND OF THE INVENTION

The present invention relates to a system for holding a plurality of light beams in predetermined relative positions. The system according to the present invention finds its suitable application to a system using a plurality of light beams obtained from a plurality of light sources, such as an optical disk recording system, a laser beam printer or a laser facsimile.

In the prior art, there are several devices for attaining high light output by aligning a plurality of laser beams into one optical axis and by focusing the same on one point in a recording medium. Of these devices, there is known: a method using a polarizing prism 3 which allows a p-polarized light 1 to transmit therethrough while reflecting an s-polarized light 2, as shown in FIG. 1, by making use of the polarizing characteristics of a laser beam; a method using a mirror filter 6 having its multiple layers coated to allow one beam 4 of two laser beams having different wavelengths to transmit therethrough but to reflect the other beam 5, as shown in FIG. 2; a method using a diffraction grating 7, as shown in FIG. 3; or a method making use of a hologram 8, as shown in FIG. 4.

However, any of the aforementioned methods finds it difficult to register spots on the recording medium, and is susceptible to the effect of external disturbances such as vibrations or changes in temperature, so that even if registration could be made by an adjustment, the inherent defects make it likely that such registration would be unsatisfactory. Thus, it is the current state of the art that the existing methods do not suffice in practice.

In a system such as a laser printer or a facsimile for scanning with light, optical scanning is conducted by moving a rotating polygonal mirror or a galvanomirror at high speed. To achieve high speed and high resolution, it is necessary to speed up the operation to a very high level, but this level has its limitations.

To cope with these limitations, current practices to reduce the need for high operating speed of the optical deflector of a rotating polygonal mirror by conducting simultaneous scanning operations with a plurality of light spots obtained from a plurality of light sources.

These light sources are generally of two types: (1) a semiconductor laser array or light emitting diode array (2) a plurality of light source elements.

When these light source elements are used, the light source elements must be accurately positioned relative to each other. However, it sometimes happens that adjacent spots overlap or are spaced too far apart, with unsatisfactory results in either case.

SUMMARY OF THE INVENTION

An object of the present invention is to provide a system for holding a plurality of light beams accurately in predetermined relative positions.

Another object of the present invention is to provide a laser beam composing system which can register a plurality of laser beams on a common point in a recording medium without being susceptible to the effect of external disturbances.

Still another object of the present invention is to provide an optical scanning system which can attain excellent scanning results even when using a plurality of light sources.

These objects can be achieved by the system according to the present invention, which comprises: a plurality of diode lasers; a plurality of lenses corresponding to said diode lasers, respectively, for focusing the light beams coming from said diode lasers, respectively; a plurality of actuators supporting either said diode lasers or said lenses, respectively; at least one detector arrangement for optically detecting the displacements of the plural light beams, which are emitted from said diode lasers, respectively, and focused by said lenses, respectively, from a predetermined position; and control circuit means for controlling said actuators in response to a detection signal from said detector arrangement so that the displacement of said light beams from said predetermined position may be reduced.

DETAILED DESCRIPTION OF THE PREFERRED EMBODIMENTS

Figure 1:
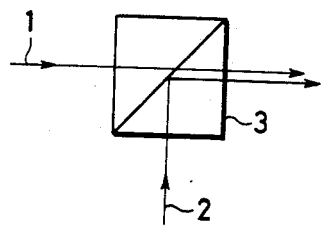
FIGS. 1 to 4 show conventional examples for composing beams.
Figure 2:
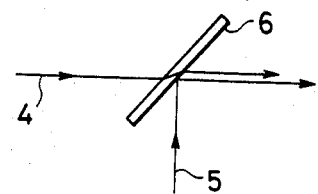
Figure 3:
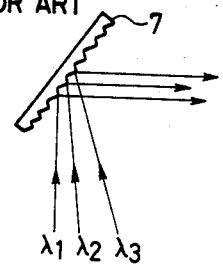
Figure 4:
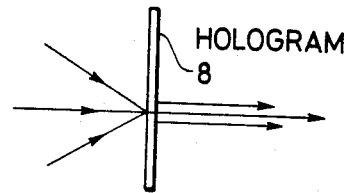

The present invention will be described in the following in connection with one embodiment thereof with reference to FIG. 5.

The beams, which are emitted from both a diode laser 9 arranged to project a p-polarized light to a polarizing prism 3 and a diode laser 10 arranged to project an s-polarized light to the polarizing prism 3, are composed by the polarizing prism 3 and aligned with respect to their optical axes into one beam. This beam is focused on a recording medium 12 as a double intensity laser beam by a focusing lens 11.

As the recording medium 12, there can be used an optical disk or a photoconductive drum of a laser beam printer.

In the present invention, a coupling lens 13 or 14 for focusing the beam from the diode laser 9 or 10 is supported by an actuator 15 or 16, respectively. As a result, even if the two spots are displaced on the aforementioned recording medium by external disturbances, the coupling lens 13 or 14 is moved in a plane normal to the optical axis by the action of the actuator 15 or 16 so that the two spots are adjusted to make an accurate registration. In the present embodiment, it is quite natural that the coupling lenses may be fixed, with the diode lasers being supported by the actuators.

Here arises the problem of a method of detecting displacement. One example of this method is shown in FIG. 6.

Figure 5:
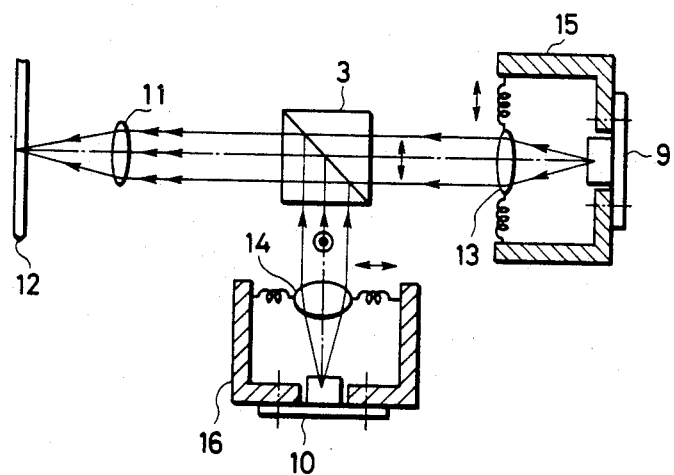
FIG. 5 is a schematic view showing one example of a drive unit of the present invention.
Figure 6:
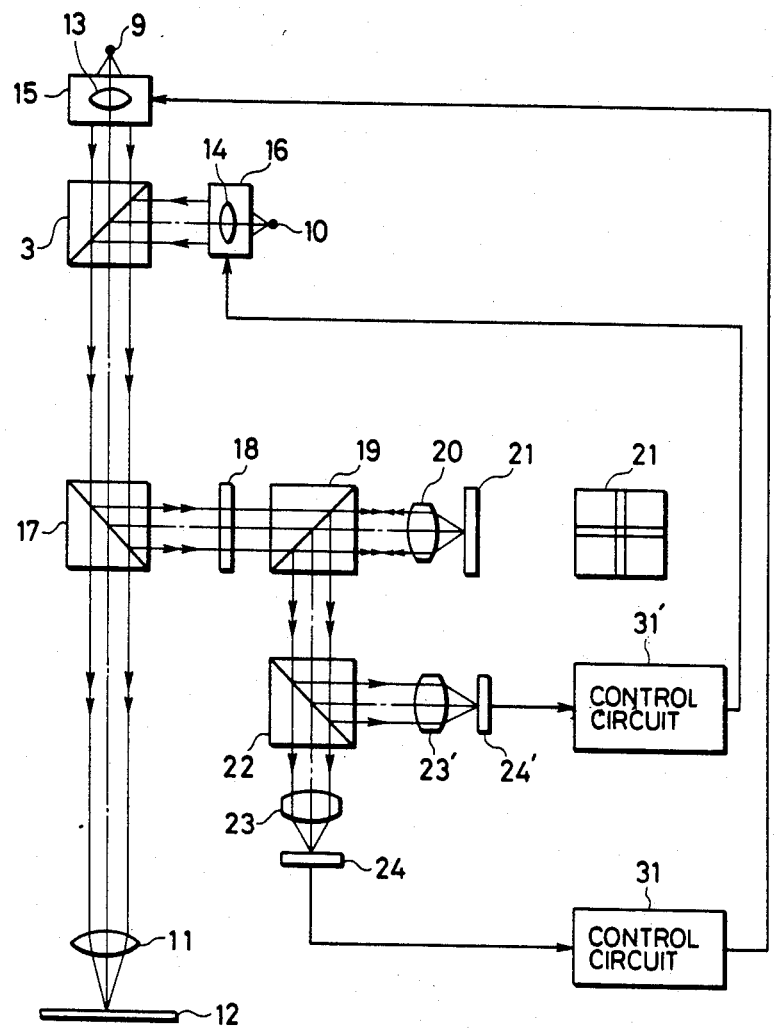
FIG. 6 is a schematic view showing one embodiment of the present invention.
Figure 7:
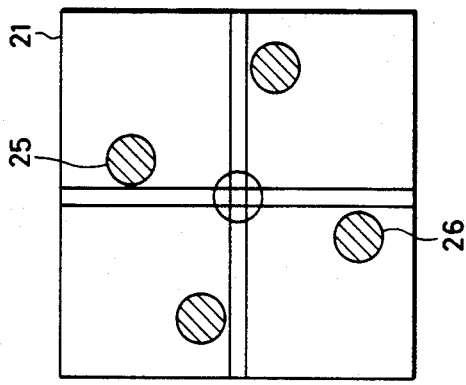
FIG. 7 is a view showing a reference plate and spots on an enlarged scale.

In FIG. 6, a composite beam coming from a unit similar to that shown in FIG. 5 is caused to transmit through a half-transparent prism (or mirror) 17 having a transmissivity of 50% or higher so that the beam having been transmitted is focused as a highly intense beam on the recording medium 12 through the focusing lens 11. The beam reflected by the prism 17 reaches a reference plate 21 through an optical element 18 such as a diffraction grating, a half-transparent prism 19 and a focusing lens 20. The reference plate 21 is formed with grooves having longitudinal and transverse depths of $\lambda/4$ (wherein $\lambda$ designates the wavelength of the laser beam). As shown in FIG. 7, at least four side spots have to be focused on the reference plate 21 by the optical element 18. As this optical element 18, there may be used one which is formed in the two-dimensional configuration of gratings, i.e., longitudinal and transverse gratings, for example.

Figure 8:
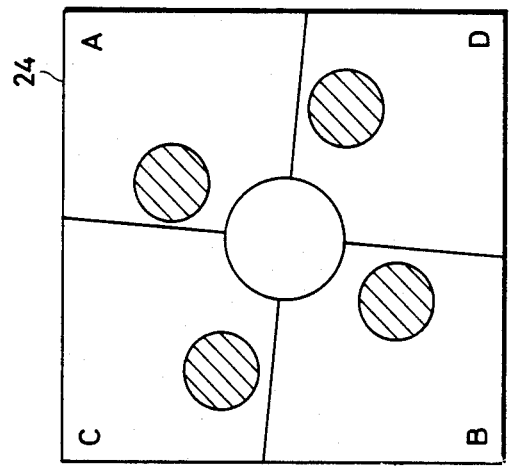
FIG. 8 is a view showing an optical detector on an enlarged scale.

The beam reflected from the reference plate 21 is further reflected by the half-transparent mirror 19, as shown in FIG. 6, and is separated by a polarizing prism 22 for p-s separation until the separated beams reach optical detector arrangements 24 and 24' through lenses 23 and 23'. The optical detector arrangements 24 or 24', as shown in FIG. 8, comprises four detectors A, B, C and arranged adjacent one another and, on which the spots on the reference plate are focused.

If the diode laser 9 should be displaced slightly from the position in the drawing by external disturbances, spots 25 and 26 would be displaced on the reference plate. In accordance with this displacement, one of the spots falls on one groove. The portion of the spot reaching the groove is subjected to phase modulation of $\pi/2$ so that the quantity of the beam capable of returning to the lens 23 after reflection is reduced.

As a result, an imbalance is caused in the quantity of the beam on the optical detector arrangement to establish a difference between the output photo currents of the opposed detectors. This difference is detected as a spot displacement detection signal and is fed back to the actuator 15 by the action of a control circuit 31 so that the actuator 15 may be controlled to focus the center spot on a cross point in the reference plate at all times. If this mechanism is applied to the two diode laser light sources 9 and 10, the two spots are composed on the reference plate 21.

Now, the diode laser light sources 9 and 10 and the image points on the reference 21 are conjugate to each other. The light sources 9 and 10 are also in conjugate relationship to the image points on the recording medium 12. As a result, the spots on the reference plate 21 and the spots on the recording medium 12 are conjugate to each other, and the spots on the reference plate 21 are made immovable by the servomechanism so that the spots on the recording medium 12 are also immovable.

Figure 9:
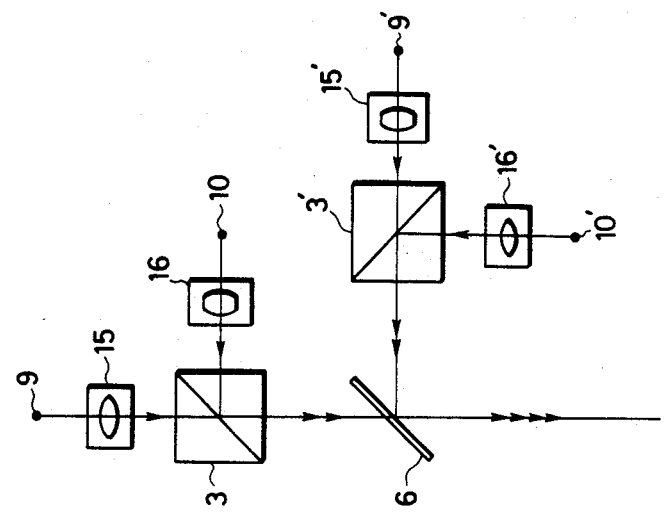
FIG. 9 is a schematic view showing another embodiment of the present invention.

Although the description thus far made is directed to the composition of the two light sources, four light sources, for example, can be composed, as shown in FIG. 9. Specifically, four beams can be composed into one at about quadruple intensity by the actions of two polarizing prisms 3 and 3' and the filter mirror 6 which is operative to allow a beam having a wavelength $\lambda_1$ to transmit therethrough but to reflect a beam having a wavelength $\lambda_2$.

As has been described hereinbefore, according to the present invention, the plural laser beams can be composed into one beam to obtain a laser spot intensified several times, although this has been impossible in the prior art. Moreover, the composed beam is not dispersed even by vibrations or fluctuations in temperature.

Figure 10:
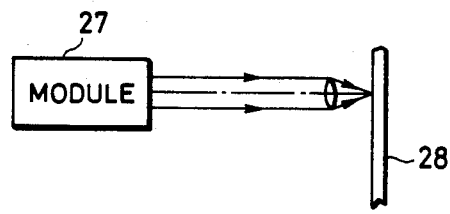
FIGS. 10, 11 and 12 are schematic views showing examples of application of the present invention, respectively.

Such a high-output laser beam module 27 can be applied, for example, to a light source for an optical disk of a DRAW (Direct Read After Write) system, as shown in FIG. 10, so that the system can be speeded up or can use a recording material having a high shelf stability despite low photosensitivity.

Figure 11:
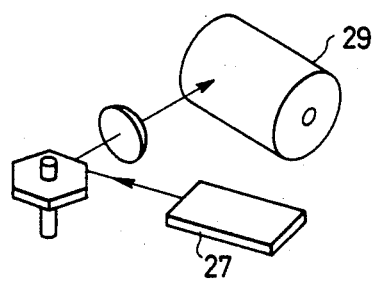

Moreover, if the module 27 is applied to the optical system of a laser beam printer, as shown in FIG. 11, it is possible to use an amorphous silicon photoconductive drum 29 which has excellent characteristics such as durability and safety despite low sensitivity. Obviously, printing speed can be improved.

Figure 12:
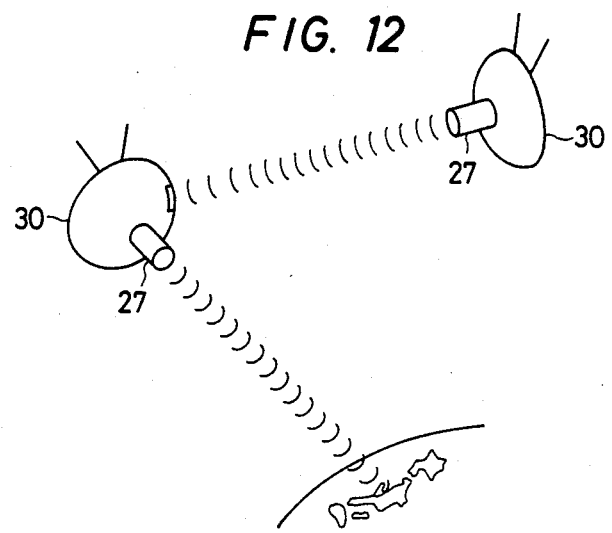

As shown in FIG. 12, moreover, such a high-output light source module 27 can be mounted on an artificial satellite 30 so that it can be used for optical communication, satellite to earth or satellite to satellite.

Figure 13:
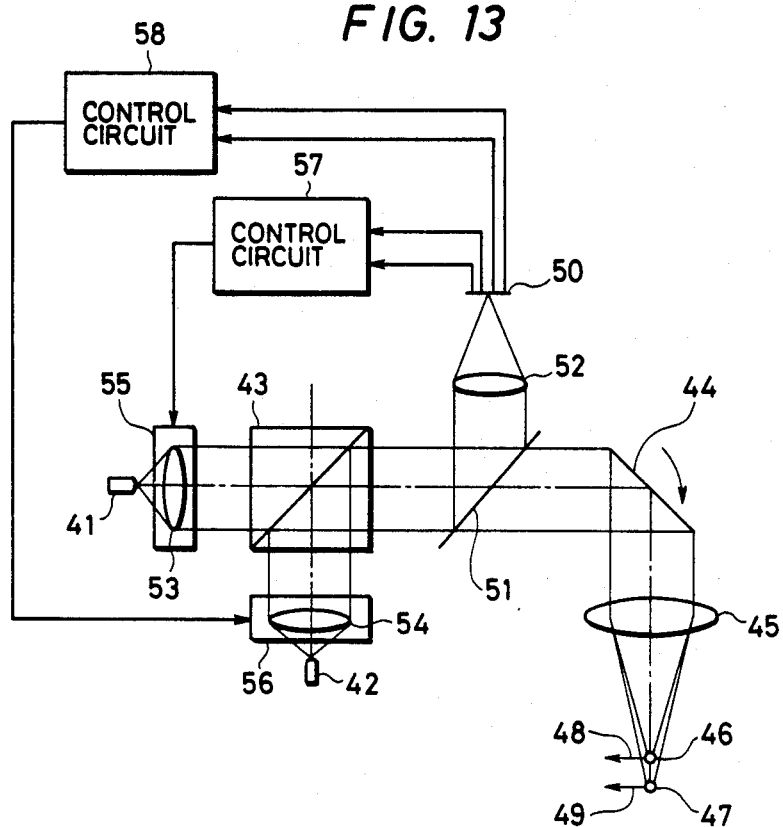
FIG. 13 is a schematic view showing still another embodiment of the present invention.

FIG. 13 shows another embodiment of the present invention.

In this embodiment, two linearly polarized light sources 41 and 42 have their respective polarizing directions oriented at a right angle (i.e., p- and s-polarized). Indicated at reference numeral 43 is a polarizing prism which allows the p-polarized beam to be transmitted therethrough and to reflect the s-polarized beam at a right angle. The beams emitted from the respective light sources are radiated in exactly the same direction after having passed through the polarizing prism 43, and the two beams are simultaneously deflected by an optical deflector 44. These beams are focused as spots 46 and 47 on a scanning plane by a scanning lens 45. Thus, a simultaneous scan is conducted with the two spots 46 and 47. Arrows 48 and 49 indicate the scanning line and the scanning direction by spots 46 and 47, respectively. However, it is necessary to set the diameters of and spacings between the spots on the scanning plane in a suitable relationship.

Figure 14:
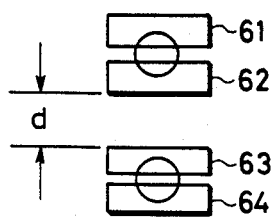
FIG. 14 is a view showing the construction of an optical detector used in the embodiment of FIG. 13.

Indicated at numeral 50 is an optical detector arrangement which is composed of detectors 61, 62, 63 and 64 closely arranged as shown in FIG. 14. These detectors are arranged such that the p-polarized light spot is incident upon the detectors 61 and 62 whereas the s-polarized light spot is incident upon the detectors 63 and 64. The beam having passed through the polarizing prism 43 is partially directed through a lens 52 to the optical detector arrangement 50 by a half mirror 51.

If the positions of the light sources 41 and 42 or coupling lenses 53 and 54 are so controlled by means of a servomechanism that both the differential output between the detectors 61 and 62 and the differential output between the detectors 63 and 64 may be reduced to zero, the positional relationship among the respective light spots is held on the scanning plane, too.

In the present embodiment, the coupling lenses 53 and 54 are supported by actuators 55 and 56, respectively. The difference between the output of the detector 61 and the output of the detector 62 is fed back to the actuator 55 by a control circuit 57, and the actuator 55 is so controlled that the difference in those outputs may be zero. On the other hand, the difference between the outputs of the detectors 63 and 64 is fed back to the actuator 56 by a control circuit 58, and the actuator 56 is so controlled that the difference in those outputs may be zero.

The spacing between the light spots can be set at an arbitrary distance by arbitrarily selecting the distance d between the detectors 62 and 63.

Figure 15:
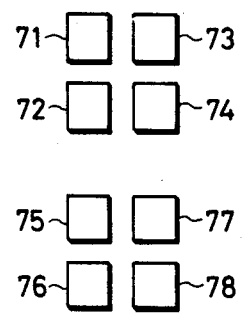
FIG. 15 is a view showing another example of the optical detector used in the present invention.

FIG. 15 is a view showing still another embodiment of the present invention, i.e., another example of the construction of the optical detector arrangement.

The position one light spot is detected and controlled by one optical detector arrangement which is composed of four detector 71, 72, 73 and 74, whereas the position of the other beam is detected and controlled by the other optical detector arrangement which is composed of four other detectors 75, 76, 77 and 78. The four segments 71, 72, 73 and 74 are so arranged that they are positioned in two adjacent lines and in two adjacent columns. The other four detectors 75, 76, 77 and 78 are similarly arranged. If the outputs of the respective detectors are designated at D(71), D(72), D(73), - - -, and D(78), respectively, the scanning spacing is controlled by the following formulas:

$$D(71)+D(73)-\{D(72)+D(74)\}; \text{ and}$$

$$D(75)+D(77)-\{D(76)+D(78)\}; \text{ and}$$

the spacing between the two light spots in the scanning direction is controlled by the following formulas:

$$D(71)+D(72)-\{D(73)+D(74)\}; \text{ and}$$

$$D(75)+D(76)-\{D(77)+D(78)\}.$$

For these controls, the lenses 53 and 54 or the light sources 41 and 42 may be supported by actuators which are controlled by the outputs of the aforementioned segments so that they may move two-dimensionally.

As has been described hereinbefore, according to the present invention, due to the provision of the means for adjusting the spacing between the plural light sources, excellent scanning results can be obtained even if plural light sources are used. Since the spacing between the light sources is adjusted electrically in an automatic manner according to the present invention, moreover, high precision is not required for the arrangement of the respective light sources, and considerable effect can be expected for realizing an optical scanning system using plural light sources.

What is claimed is:

1. A system for holding a plurality of light beams in predetermined relative positions, comprising:
    a plurality of diode lasers;
    a plurality of lenses corresponding to said diode lasers, respectively, for focusing the light beams coming from said diode lasers, respectively;
    a plurality of actuators supporting either said diode lasers or said lenses, respectively;
    at least one detector means for optically detecting the displacement of the plural light beams, which are emitted from said diode lasers, respectively, and focused by said lenses, respectively, from a predetermined position; and
    control circuit means for controlling said actuators in response to a detection signal from said detector means so that the displacement of said light beams from said predetermined position may be reduced.

2. A system according to claim 1, wherein said detector means includes two detectors for each of said light beams so that the difference between the outputs of said two detectors may be used as a signal for controlling the positions of said light beams.

3. A system according to claim 1, wherein said detector means includes four detectors arranged in two adjacent lines and in two adjacent columns so that the difference between the sum of the outputs of the two detectors in one of said two lines and the sum of the outputs of the two detectors in the other line may be used as a signal for controlling the positions of said light beams in a direction corresponding to said columns and so that the difference between the sum of the outputs of the two detectors in one of said two columns and the sum of the outputs of the two detectors in the other column may be used as a signal for controlling the positions of said light beams in a direction corresponding to said lines.

4. A system for composing a plurality of light beams into a single beam, comprising:
    a plurality of diode lasers;
    a plurality of lenses corresponding to said diode lasers, respectively, for focusing the light beams coming from said diode lasers, respectively;
    a plurality of actuators supporting either said diode lasers or said lenses, respectively;
    a plurality of detector means for optically detecting the displacement of the plural light beams, which are emitted from said diode lasers, respectively, and focused by said lenses, respectively, from a predetermined position; and
    control circuit means for controlling said actuators in response to detection signals from said detector means so that the displacement of said light beams from said predetermined position may be reduced.

5. A system for simultaneously scanning a plurality of scanning lines with a plurality of light beams, comprising:
    a plurality of diode lasers;
    a plurality of lenses corresponding to said diode lasers, respectively, for focusing the light beams coming from said diode lasers, respectively;
    a plurality of actuators supporting either said diode lasers or said lenses, respectively;
    at least one detector means for optically detecting the displacement of the plural light beams, which are emitted from said diode lasers, respectively, and focused by said lenses, respectively, from predetermined positions; and
    control circuit means for controlling said actuators in response to a detection signal from said detector means so that the displacement of said light beams from said predetermined positions may be reduced.

6. A system according to claim 4, wherein each of said detector means includes two segments detectors so that the difference between the outputs of said two detectors may be used as a signal for controlling the positions of said light beams.

7. A system according to claim 4, wherein each of said detector means includes four detectors arranged in two adjacent lines and in two adjacent columns so that the difference between the sum of the outputs of the two detectors in one of said two lines and the sum of the outputs of the two detectors in the other line may be used as a signal for controlling the positions of said light beams in a direction corresponding to said columns and so that the difference between the sum of the outputs of the two detectors in one of said two columns and the sum of the outputs of the two detectors in the other column may be used as a signal for controlling the positions of said light beams in a direction corresponding to said lines.

8. A system according to claim 5, wherein said detector means includes two detectors for each of said light beams so that the difference between the outputs of said two detectors may be used as a signal for controlling the positions of said light beams.

9. A system according to claim 5, wherein said detector means includes four detectors arranged in two adjacent lines and in two adjacent columns so that the difference between the sum of the outputs of the two detectors in one of said two lines and the sum of the outputs of the two detectors in the other line may be used as a signal for controlling the positions of said light beams in a direction perpendicular to the scanning direction and so that the difference between the sum of the outputs of the two detectors in one of said two columns and the sum of the outputs of the two detectors in the other column may be used as a signal for controlling the positions of said light beams in said scanning direction.

10. A system according to claim 3, further comprising: means for separating from one light beam, another light beam for detecting the positional displacement of the former one; optical elements for generating at least four side beams around the detecting light beam, which is separated by said separating means, so as to obtain at least four side spots around the spot of said detecting light beam; and a reference plate having its surface segmented into four segments by two perpendicular grooves having a depth of one fourth the wavelength of the light beam and having an optically reflective surface on which each of said four side spots is focused on one of said four segments, each of said four detectors of said detector means is made receptive of one of the four side spots which are reflected on the surface of said reference plate.

11. A system according to claim 7, further comprising: means for separating from one light beam another light beam for detecting the positional displacement of the former one; optical elements for generating at least four side beams around the detecting light beam which is separated by said separating means, so as to obtain at least four side spots around the spot of said detecting light beam; and a reference plate having its surface segmented into four segments by two perpendicular grooves having a depth of one fourth as large as the wavelength of the light beam and having an optically reflective surface on which each of said four side spots is focused on one of said four detectors, each of said four segments of said detector means is made receptive of one of the four side spots which are reflected on the surface of said reference plate.

12. A system according to claim 9, further comprising: means for separating from one light beam another light beam for detecting the positional displacement of the former one; optical elements for generating at least four side beams around the detecting light beam which is separated by said separating means, so as to obtain at least four side spots around the spot of said detecting light beam; and a reference plate having its surface segmented into four segments by two perpendicular grooves having a depth of one fourth as large as the wavelength of the light beam and having an optically reflective surface on which each of said four side spots is focused on one of said four detectors, each of said four segments of said detector means is made receptive of one of the four side spots which are reflected on the surface of said reference plate.

* * * * *